(12) United States Patent
Shimomura et al.

(10) Patent No.: US 8,201,397 B2
(45) Date of Patent: Jun. 19, 2012

(54) EXHAUST GAS PURIFICATION DEVICE OF INTERNAL COMBUSTION ENGINE

(75) Inventors: Osamu Shimomura, Okazaki (JP);
Masatoshi Maruyama, Kariya (JP);
Masakazu Sakata, Obu (JP)

(73) Assignees: Denso Corporation, Kariya (JP);
Nippon Soken, Nishio (JP)

( * ) Notice: Subject to any disclaimer, the term of this patent is extended or adjusted under 35 U.S.C. 154(b) by 377 days.

(21) Appl. No.: 12/470,917

(22) Filed: May 22, 2009

(65) Prior Publication Data

US 2009/0288397 A1 Nov. 26, 2009

(30) Foreign Application Priority Data

May 26, 2008 (JP) ................................. 2008-136509

(51) Int. Cl.
*F01N 3/00* (2006.01)
(52) U.S. Cl. .......................................... 60/295; 60/301
(58) Field of Classification Search .................... 60/286, 60/295, 299, 301
See application file for complete search history.

(56) References Cited

U.S. PATENT DOCUMENTS

| | | | |
|---|---|---|---|
| 6,755,014 B2 * | 6/2004 | Kawai et al. ................. | 60/286 |
| 7,028,465 B2 * | 4/2006 | Ripper et al. ................. | 60/286 |
| 7,213,395 B2 | 5/2007 | Hu et al. | |
| 7,334,400 B2 | 2/2008 | Yan et al. | |
| 7,650,746 B2 | 1/2010 | Hu et al. | |
| 2003/0182935 A1 | 10/2003 | Kawai et al. | |
| 2005/0034450 A1 | 2/2005 | Itoh et al. | |
| 2005/0204729 A1 | 9/2005 | Itoh et al. | |
| 2005/0217248 A1 | 10/2005 | Itoh et al. | |
| 2005/0217249 A1 | 10/2005 | Itoh et al. | |
| 2005/0262829 A1 | 12/2005 | Itoh et al. | |
| 2005/0262832 A1 | 12/2005 | Itoh et al. | |
| 2007/0056268 A1 | 3/2007 | McCarthy, Jr. | |

FOREIGN PATENT DOCUMENTS

| | | |
|---|---|---|
| JP | 2003-293738 | 10/2003 |
| JP | 2003-293739 | 10/2003 |
| JP | 2003-293743 | 10/2003 |
| JP | 2003-314256 | 11/2003 |
| JP | 2003314256 A * | 11/2003 |

(Continued)

OTHER PUBLICATIONS

Japanese Office Action dated Mar. 2, 2010, issued in corresponding Japanese Application No. 2008-136509, with English translation.
Japanese Office Action dated Sep. 28, 2010, issued in corresponding Japanese Application No. 2008-136509, with English translation.
German Office Action dated Oct. 1, 2010, issued in corresponding German Application No. 10 2009 002 950.8-13, with English translation.

*Primary Examiner* — Thomas Denion
*Assistant Examiner* — Patrick Maines
(74) *Attorney, Agent, or Firm* — Nixon & Vanderhye P.C.

(57) ABSTRACT

An SCR catalyst is provided in an exhaust pipe of an engine and a urea solution addition valve is provided upstream of the SCR catalyst in the exhaust pipe. An ECU controls urea solution addition quantity of the urea solution addition valve based on ammonia adsorption quantity to the SCR catalyst. The ECU calculates the ammonia adsorption quantity in the SCR catalyst based on time-series data of an ammonia balance between ammonia supply to the SCR catalyst accompanying the urea solution addition of the urea solution addition valve and ammonia consumption in the SCR catalyst. The ECU calculates NOx quantity introduced into the SCR catalyst or a parameter correlated with the NOx quantity and performs initialization of the ammonia adsorption quantity at timing decided based on a result of the calculation.

17 Claims, 8 Drawing Sheets

FOREIGN PATENT DOCUMENTS

| | | | |
|---|---|---|---|
| JP | 2005-127256 | | 5/2005 |
| JP | 2005127256 A | * | 5/2005 |
| JP | 2008-115775 | | 5/2008 |
| JP | 2008115775 A | * | 5/2008 |

* cited by examiner

EXHAUST GAS PURIFICATION DEVICE OF INTERNAL COMBUSTION ENGINE

CROSS REFERENCE TO RELATED APPLICATION

This application is based on and incorporates herein by reference Japanese Patent Application No. 2008-136509 filed on May 26, 2008.

BACKGROUND OF THE INVENTION

1. Field of the Invention

The present invention relates to an exhaust gas purification device of an internal combustion engine. In particular, the present invention is suitably applied to an exhaust gas purification system that uses selective catalytic reduction (SCR) for selectively purifying NOx (nitrogen oxides) in exhaust gas with ammonia as a reducing agent. The above system is known as a urea SCR system since urea aqueous solution is generally used as the reducing agent.

2. Description of Related Art

In recent years, a urea SCR system has been developed and partly adopted in practical use as an exhaust gas purification system that purifies NOx in exhaust gas at a high purification rate in an engine (specifically, a diesel engine) applied to an automobile or the like. A following construction is known as the urea SCR system. That is, in the urea SCR system, a selective reduction NOx catalyst is provided to an exhaust pipe connected to an engine main body, and a urea solution addition valve for adding urea solution (urea aqueous solution) as a NOx reducing agent into the exhaust pipe is provided upstream of the NOx catalyst.

In the above-described system, the urea solution is added into the exhaust pipe by the urea solution addition valve, so NOx in the exhaust gas are selectively reduced and removed on the NOx catalyst. Concerning the reduction of NOx, ammonia ($NH_3$) is generated when the urea solution is hydrolyzed with exhaust heat. The ammonia adsorbs to the NOx catalyst, and a reduction reaction based on the ammonia occurs on the NOx catalyst. Thus, NOx are reduced and purified.

In order to increase a NOx purification rate in the NOx catalyst and to inhibit occurrence of ammonia slip at the same time, it is necessary to supply just enough ammonia to the NOx catalyst. Therefore, there is a proposed technology that estimates ammonia adsorption quantity in a NOx catalyst (i.e., reducing agent adsorption quantity) and that controls urea solution addition quantity of a urea solution addition valve based on the estimate (for example, as described in Patent document 1: JP-A-2003-293737 or Patent document 2: JP-A-2003-293738). More specifically, NOx discharge quantity discharged from the engine and an actual NOx purification rate in the NOx catalyst are calculated. Ammonia consumption quantity in the NOx catalyst is calculated based on the NOx discharge quantity and the actual NOx purification rate. The ammonia adsorption quantity is calculated based on the ammonia consumption quantity and the urea solution addition quantity at the time. The urea solution addition quantity is controlled in accordance with the ammonia adsorption quantity.

It is difficult to directly measure the ammonia adsorption quantity in the NOx catalyst. Therefore, generally, technologies including the above-described conventional technologies employ a construction estimating the ammonia adsorption quantity from a measurement value of a NOx sensor or the like provided in the exhaust pipe.

However, it is thought that an error is caused by various factors when the ammonia adsorption quantity is calculated. Therefore, there is a concern that the control of the urea solution addition quantity is not performed appropriately when the error is included in the ammonia adsorption quantity, thereby deteriorating the NOx purification rate or causing ammonia slip. It is thought that the factors of the calculation error of the ammonia adsorption quantity include accuracy deterioration of the various sensors, the ammonia slip, and measurement errors or calculation errors of various parameters due to a side reaction of the urea solution and the like, for example.

There is no effective technology among the conventional technologies including the above-described technologies of Patent documents 1 and 2 for removing the calculation error of the ammonia adsorption quantity. There is a room for improvement.

SUMMARY OF THE INVENTION

It is an object of the present invention to provide an exhaust gas purification device of an internal combustion engine capable of improving calculation accuracy of ammonia adsorption quantity in a NOx catalyst and suitably causing NOx purification in the NOx catalyst.

According to an aspect of the present invention, an exhaust gas purification device is applied to an exhaust gas purification system that has a NOx catalyst (SCR catalyst) provided in an exhaust passage of an internal combustion engine for adsorbing a reducing agent and for selectively purifying NOx in exhaust gas with the reducing agent and that adds the reducing agent with a reducing agent adding device upstream of the NOx catalyst with respect to a flow direction of the exhaust gas. The exhaust gas purification device calculates reducing agent adsorption quantity in the NOx catalyst based on time-series data of a balance between supply of the reducing agent to the NOx catalyst accompanying the addition of the reducing agent by the reducing agent adding device and consumption of the reducing agent due to a reduction reaction in the NOx catalyst. The exhaust gas purification device calculates NOx quantity introduced into the NOx catalyst or a parameter correlated with the NOx quantity. The exhaust gas purification device performs initialization of the reducing agent adsorption quantity at timing decided based on a calculation result of the NOx quantity introduced into the NOx catalyst or the parameter correlated with the NOx quantity.

In the NOx catalyst, adsorption of the reducing agent occurs in accordance with the balance between the supply and the consumption of the reducing agent under an operation state of the internal combustion engine. The exhaust gas purification device according to the above aspect of the present invention calculates the reducing agent adsorption quantity by accumulating the time-series data in response to the adsorption of the reducing agent. Processing for setting the initial value to once reset the accumulation of the time-series data corresponds to the initialization.

As for the calculation of the reducing agent adsorption quantity, according to another aspect of the present invention, the exhaust gas purification device calculates a difference between supply quantity of the reducing agent to the NOx catalyst and consumption quantity of the reducing agent in the NOx catalyst for every specified time as the time-series data of the balance between the supply and the consumption of the reducing agent and calculates the reducing agent adsorption quantity in the NOx catalyst by sequentially integrating the calculated value of the time-series data.

In short, occurrence of the calculation error (the estimation error) in the reducing agent adsorption quantity is inevitable in the construction that calculates the reducing agent adsorption quantity based on the time-series data of the balance between the supply and the consumption of the reducing agent in the NOx catalyst. It is thought that the factors of the calculation error include the measurement errors or the calculation errors of the various parameters and the like used for calculating the reducing agent supply quantity accompanying the reducing agent addition, the reducing agent consumption quantity accompanying the NOx reaction and the like (i.e., the time-series data). It is difficult to correctly calculate the error included in the time-series data of each time. In this case, there is a concern that accuracy of control using the calculated value of the reducing agent adsorption quantity such as the reducing agent addition control is deteriorated by the calculation error of the reducing agent adsorption quantity.

In this regard, according to the above aspect of the present invention, focusing on the difference arising in the calculation error of the reducing agent adsorption quantity according to the NOx quantity introduced into the NOx catalyst, the initialization of the reducing agent adsorption quantity is performed at the timing decided based on the NOx quantity introduced into the NOx catalyst or the parameter correlated with the NOx quantity. Therefore, the initialization of the reducing agent adsorption quantity can be performed after waiting until the calculation error included in the calculation result of the reducing agent adsorption quantity becomes large while grasping the calculation error, i.e., after waiting for occurrence of a predetermined error generation state where the error of the reducing agent adsorption quantity exceeds a predetermined quantity. Accordingly, the initialization processing of the reducing agent adsorption quantity, that is, error cancellation processing, can be performed in the state where the error of the reducing agent adsorption quantity has come to be grasped clearly because of the accumulation of the error included in the time-series data of each time. As a result, the calculation accuracy of the reducing agent adsorption quantity in the NOx catalyst can be improved, and eventually the NOx purification in the NOx catalyst can be performed suitably.

According to another aspect of the present invention, the reducing agent addition quantity added by the reducing agent adding device is controlled based on the reducing agent adsorption quantity. Since the calculation accuracy of the reducing agent adsorption quantity is improved as described above, the control accuracy of the reducing agent addition quantity can be improved.

According to another aspect of the present invention, the exhaust gas purification device calculates a NOx quantity integration value by sequentially integrating the NOx quantity introduced into the NOx catalyst and performs the initialization at timing when the NOx quantity integration value reaches a predetermined value.

The NOx quantity introduced into the NOx catalyst changes every moment in accordance with the operation state of the internal combustion engine and the like. For example, when the NOx quantity increases because of continuation of a high load operation or a high rotation speed state in time series, it is thought that the calculation error of the reducing agent adsorption quantity increases because of the increase in the measurement error of the NOx quantity and the like. On the contrary, when the NOx quantity is small, it is thought that the calculation error of the reducing agent adsorption quantity is not so large.

In this regard, according to the above-described construction that decides the timing of the initialization based on the NOx quantity integration value, the timing when the initialization of the reducing agent adsorption quantity is necessary can be suitably determined in accordance with the change in the NOx quantity for each operation state of the internal combustion engine. With the above construction, the initialization of the reducing agent adsorption quantity can be performed at a comparatively short time interval, i.e., comparatively frequently, when the engine operation state at the high load or at the high rotation speed is continued, for example.

According to another aspect of the present invention, next initialization timing is decided every time the initialization is performed.

According to another aspect of the present invention, the next initialization timing is decided based on the NOx quantity at the time when the initialization is performed.

Also in these cases, the timing when the initialization of the reducing agent adsorption quantity is necessary can be determined appropriately. With such the constructions, the initialization of the reducing agent adsorption quantity can be performed at a comparatively short time interval, i.e., comparatively frequently, when the engine operation state at the high load or at the high rotation speed is continued, for example.

According to another aspect of the present invention, the exhaust gas purification device calculates an actual NOx purification rate of the NOx catalyst. The exhaust gas purification device performs the initialization of the reducing agent adsorption quantity according to the actual NOx purification rate at the time based on a predetermined relationship between the reducing agent adsorption quantity and the NOx purification rate. The reducing agent adsorption quantity is correlated with the NOx purification rate (for example, refer to FIG. 7). Therefore, the appropriate initialization of the reducing agent adsorption quantity can be performed by using the correlation.

It is thought that reliability of the reducing agent adsorption quantity falls even if the execution timing of the initialization is reached when the NOx purification rate (initialization data) used for the initialization is improper.

Therefore, according to another aspect of the present invention, the exhaust gas purification device determines whether the NOx purification rate (i.e., the calculated value at the time) is a proper value to be used for the initialization at the execution timing of the initialization. The exhaust gas purification device performs the initialization of the reducing agent adsorption quantity when it is determined that the NOx purification rate is proper. In this case, the reliability in the case where the reducing agent adsorption quantity is initialized with the NOx purification rate can be improved. In short, when the NOx purification rate is used as the initialization data, a large difference arises in the calculation accuracy of the NOx purification rate in accordance with the operation state or an exhaust state of the internal combustion engine and the like. Therefore, it is necessary to determine the properness of the NOx purification rate while selecting the condition providing the high calculation accuracy of the NOx purification rate.

According to another aspect of the present invention, the exhaust gas purification device performs the initialization of the reducing agent adsorption quantity according to the calculated value of the actual NOx purification rate based on a predetermined relationship between the reducing agent adsorption quantity and the NOx purification rate. The exhaust gas purification device determines whether the NOx purification rate is a proper value to be used for the initialization. The exhaust gas purification device permits the initialization on a condition that the NOx purification rate is determined to be proper. The construction according to the above aspect does not have the device for sequentially grasping the calculation error of the reducing agent adsorption quantity and deciding the timing for performing the initialization. The construction performs the initialization of the reducing agent adsorption quantity on the condition that the NOx purification rate of the NOx catalyst can be used as the initialization data appropriately. Therefore, the calculation accuracy of the reducing agent adsorption quantity in the NOx catalyst can be improved likewise, and eventually the NOx purification in the NOx catalyst can be performed suitably.

At least one of following constructions (1) to (3) may be employed as a construction for determining the properness of the NOx purification rate.

(1) According to another aspect of the present invention, the exhaust gas purification device calculates the NOx purification rate by using NOx quantity introduced into the NOx catalyst as a parameter and determines that the NOx purification rate is proper when the NOx quantity is equal to or greater than a predetermined quantity.

The NOx quantity introduced into the NOx catalyst is measured or estimated using the output values of the various sensors such as the NOx sensor. As for the accuracy of the NOx quantity, a ratio of the error increases as the NOx quantity decreases. Therefore, the calculation accuracy of the NOx purification rate improves and the accuracy of the initialization of the reducing agent adsorption quantity improves as the NOx quantity increases.

(2) According to another aspect of the present invention, the exhaust gas purification device determines whether there is a state where surplus discharge of the reducing agent in the NOx catalyst (i.e., ammonia slip) is generated. The exhaust gas purification device determines that the NOx purification rate is proper when it is determined that there is no state where the surplus discharge of the reducing agent is generated. More specifically, it may be determined that there is no generation state of the surplus discharge of the reducing agent when temperature of the NOx catalyst is lower than a predetermined value or when the NOx purification rate is larger than a predetermined value.

Generally, the NOx purification rate is calculated based on the NOx quantity upstream of the NOx catalyst and the NOx quantity downstream of the NOx catalyst. When the surplus discharge of the reducing agent (i.e., the ammonia slip) occurs, there is a concern that the downstream NOx quantity is sensed erroneously because of the reducing agent component (the ammonia component or the like) downstream of the catalyst and the calculation accuracy of the NOx purification rate lowers. It is because the NOx sensor (the NOx sensor downstream of the NOx catalyst) senses the ammonia component and the like in addition to the NOx component.

In this regard, the construction that determines that the NOx purification rate is proper on the condition that there is no generation state of the surplus discharge of the reducing agent, the lowering of the calculation accuracy of the NOx purification rate resulting from the surplus discharge of the reducing agent can be inhibited.

(3) According to another aspect of the present invention, the exhaust gas purification device senses temperature of the NOx catalyst and determines that the NOx purification rate is proper when the sensed NOx catalyst temperature is in a predetermined temperature range. More specifically, the upper limit of the temperature range for determining the properness of the NOx purification rate may be reducing agent adsorption limit temperature (i.e., ammonia adsorption limit temperature), above which the surplus discharge of the reducing agent tends to occur more easily (refer to FIG. 6). The lower limit may be activation temperature of the NOx catalyst.

When the NOx catalyst temperature is higher than the upper limit of the predetermined temperature range (i.e., the ammonia adsorption limit temperature), the calculation accuracy of the NOx purification rate lowers due to the generation of the surplus discharge of the reducing agent. When the NOx catalyst temperature is lower than the lower limit of the predetermined temperature range (i.e., the catalyst activation temperature), the NOx purification rate lowers due to lowering in the reduction reaction of the NOx catalyst regardless of the reducing agent adsorption quantity.

In this regard, the construction that determines the NOx purification rate to be proper on the condition that the NOx catalyst temperature is in the predetermined temperature range can inhibit the lowering of the calculation accuracy of the NOx purification rate.

It is inconvenient if the initialization cannot be performed when the NOx purification rate becomes improper at the execution timing of the initialization.

Therefore, according to yet another aspect of the present invention, if it is determined that the NOx purification rate is improper, the exhaust gas purification device performs recalculation of the NOx purification rate after waiting for a predetermined time. Thus, the initialization of the reducing agent adsorption quantity can be performed suitably.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereinafter, an exhaust gas purification device according to each of embodiments of the present invention will be described with reference to the drawings.

First Embodiment

Figure 1:
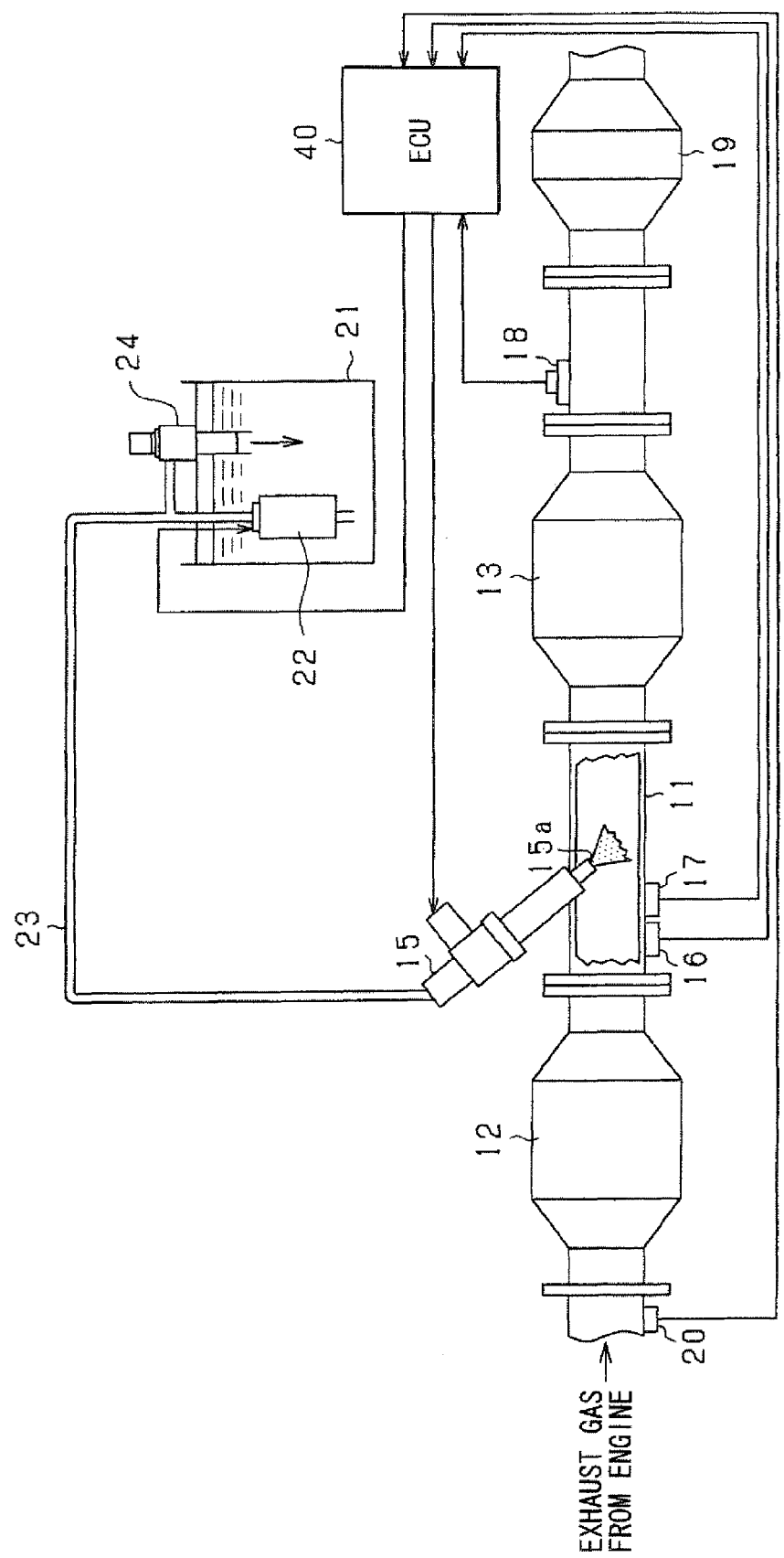
FIG. 1 is a construction diagram showing an exhaust gas purification system according to a first embodiment of the present invention.

An exhaust gas purification device according to a first embodiment of the present invention purifies NOx in exhaust gas using a selective reduction catalyst and is constructed as a urea SCR system. First, the construction of the system will be explained in detail with reference to FIG. 1. FIG. 1 is a schematic construction diagram showing an outline of the urea SCR system according to the present embodiment. The system has various actuators, various sensors, an ECU 40 (an electronic control unit) and the like for purifying exhaust gas discharged by a diesel engine (not shown) mounted in an automobile.

As for a construction of an engine exhaust system, an oxidation catalyst 12 and a selective reduction catalyst 13 (hereinafter, referred to as an SCR catalyst) are provided in this order from an upstream side in an exhaust pipe 11. The exhaust pipe 11 is connected to an engine main body (not shown) and defines an exhaust passage. A urea solution addition valve 15 for adding and supplying a urea solution (a urea aqueous solution) as a reducing agent into the exhaust pipe 11, a NOx sensor 16 and a temperature sensor 17 are provided between the oxidation catalyst 12 and the SCR catalyst 13 in the exhaust pipe 11. A NOx sensor 18 is provided downstream of the SCR catalyst 13 in the exhaust pipe 11. The NOx sensor 16 senses a NOx concentration in the exhaust gas upstream of the SCR catalyst 13. The NOx sensor 18 senses the NOx concentration in the exhaust gas downstream of the SCR catalyst 13. In the following description, the NOx sensor 16 will be referred to also as an upstream NOx sensor, and the NOx sensor 18 will be referred to also as a downstream NOx sensor.

An oxidation catalyst 19 is provided further downstream of the SCR catalyst 13 in the exhaust pipe 11 as an ammonia removing device for removing ammonia (NH3) discharged from the catalyst 13, i.e., the surplus ammonia. A temperature sensor 20 for sensing temperature of the exhaust gas discharged from the engine main body is provided upstream of the oxidation catalyst 12 in the exhaust pipe 11.

In the above-mentioned construction of the exhaust system, the exhaust gas discharged from the engine main body passes through the oxidation catalyst 12. At that time, NO (nitrogen monoxide) in the exhaust gas is transformed into NO2 (nitrogen dioxide) due to an oxidation effect of the oxidation catalyst 12. Then, NOx reduction using the ammonia is performed in the SCR catalyst 13. Details of the NOx reduction will be explained later.

The oxidation catalyst 12 may be provided as a device integrated with a DPF (Diesel Particulate Filter), which is a particulate matter removing device. In this case, the oxidation catalyst 12 may be integrated with the DPF by providing the oxidation catalyst 12 upstream of the DPF or by supporting the platinum or the like on cell surfaces of the DPF functioning as a support. The DPF is a continually-regenerative particulate matter removal filter for collecting particulate matters in the exhaust gas. The particulate matters collected by the DPF are combusted and removed, for example, by a post-injection performed after a main fuel injection in the diesel engine. The combustion and the removal of the particulate matters are equivalent to regeneration processing. Thus, continuous use of the DPF is enabled.

The SCR catalyst 13 promotes a reduction reaction of NOx (i.e., an exhaust gas purification reaction). The SCR catalyst 13 promotes following reactions to reduce NOx in the exhaust gas.

$$NO + NO_2 + 2NH_3 \rightarrow 2N_2 + 3H_2O \quad \text{(expression 1)}$$

$$4NO + 4NH_3 + O_2 \rightarrow 4N_2 + 6H_2O \quad \text{(expression 2)}$$

$$6NO_2 + 8NH_3 \rightarrow 7N_2 + 12H_2O \quad \text{(expression 3)}$$

The urea solution addition valve 15 provided upstream of the SCR catalyst 13 adds and supplies the ammonia (NH3) as the reducing agent of NOx in the above reactions.

The urea solution addition valve 15 has substantially the same construction as the existing injector for gasoline injection, so a well-known construction of the existing injector can be employed as the construction of the urea solution addition valve 15. Therefore, the construction will be explained only briefly below. The urea solution addition valve 15 is constructed as an electromagnetic on-off valve having a drive section constituted by an electromagnetic solenoid and the like and a valve body section having a needle for opening and closing a tip injection hole section. The urea solution addition valve 15 opens and closes according to an injection drive signal from the ECU 40. That is, if the electromagnetic solenoid is energized based on the injection drive signal, the needle moves in a valve opening direction due to the energization, so the urea solution is added (injected) from the tip injection hole section 15a.

The urea solution is successively supplied from a urea solution tank 21 to the urea solution addition valve 15. Next, a construction of the urea solution supply system will be explained.

The urea solution tank 21 is constituted by a hermetic container with a liquid-supplying cap and stores the urea solution of a prescribed concentration (32.5%) inside. A urea solution pump 22 is provided in the urea solution tank 21 such that the urea solution pump 22 is immersed in the urea solution. The urea solution pump 22 is an electric pump driven by a drive signal from the ECU 40 to rotate. An end of a urea solution supply pipe 23 is connected to the urea solution pump 22, and the other end of the urea solution supply pipe 23 is connected to the urea solution addition valve 15. The urea solution supply pipe 23 defines a urea solution passage. When the urea solution pump 22 is driven to rotate, the urea solution is drawn and discharged toward the urea solution addition valve 15 through the urea solution supply pipe 23.

The urea solution pump 22 is a turbine pump equipped with an electric motor (motor) as a driving source, for example. The urea solution pump 22 is structured such that an impeller rotates and the urea solution is pumped from multiple blade grooves formed on an impeller outer peripheral portion when the electric motor is driven. Alternatively, other type of pump such as a rotor pump may be adopted as the urea solution pump 22. The system is equipped with a pressure regulating valve 24 for regulating pressure of the urea solution. Discharge pressure of the urea solution pump 22 is suitably regulated with the pressure regulating valve 24. A filter (not shown) for filtering the urea solution is provided in a discharge port section of the urea solution pump 22. The urea solution, which is discharged successively, is discharged to the urea solution supply pipe 23 after extraneous matters are removed from the urea solution with the filter.

The ECU 40 is the main part that performs control related to the exhaust gas purification as the electronic control unit in the above-described system. The ECU 40 has a microcomputer (not shown) and performs various kinds of control related to the exhaust gas purification by operating the various actuators including the urea solution addition valve 15 in desired modes based on sensing values of the various sensors. Specifically, according to the present embodiment, the suitable quantity of the urea solution is added and supplied into the exhaust pipe 11 at the suitable timing by controlling energization time (i.e., valve opening time) of the urea solution addition valve 15, a drive amount of the urea solution pump 22 and the like, for example.

In the above-described system according to the present embodiment, when the engine is operating, the urea solution in the urea solution tank 21 is pumped to the urea solution addition valve 15 through the urea solution supply pipe 23 by the drive of the urea solution pump 22 and the urea solution is added and supplied into the exhaust pipe 11 by the urea solution addition valve 15. Thus, the urea solution is supplied to the SCR catalyst 13 together with the exhaust gas in the exhaust pipe 11, and the exhaust gas is purified by the occurrence of the reduction reaction of NOx at the SCR catalyst 13. On the occasion of the reduction of NOx, ammonia (NH3) is generated when the urea solution is hydrolyzed due to the exhaust heat through a reaction shown by a following expression 4, for example.

$$(NH2)2CO + H2O \rightarrow 2NH3 + CO2 \qquad \text{(expression 4)}$$

The ammonia adsorbs to the SCR catalyst 13 and NOx in the exhaust gas are selectively reduced and removed by the ammonia in the SCR catalyst 13. That is, NOx are reduced and purified on the SCR catalyst 13 through the reduction reaction based on the ammonia (as shown by the above-described reaction formulae of expression 1 to expression 3).

Figure 2:
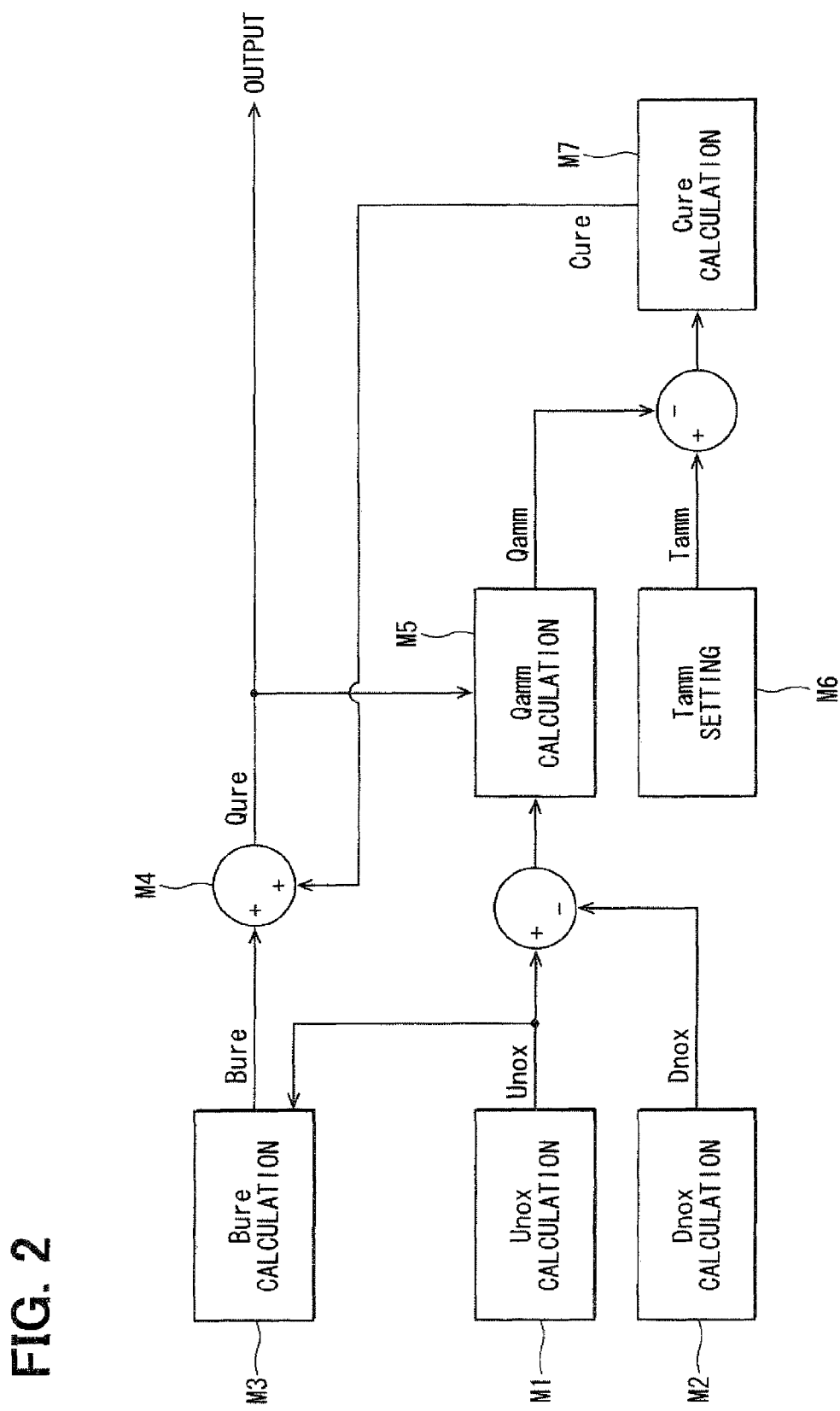
FIG. 2 is a functional block diagram related to calculation of urea solution addition quantity according to the first embodiment.

The urea solution addition quantity of the urea solution addition valve 15 is calculated with a construction shown as a functional block diagram of FIG. 2, for example.

Concerning the calculation of the ammonia adsorption quantity, the construction of FIG. 2 includes an upstream NOx quantity calculation section M1, a downstream NOx quantity calculation section M2, a basic addition quantity calculation section M3, an addition quantity correction section M4 and an ammonia adsorption quantity calculation section M5. The upstream NOx quantity calculation section M1 calculates the NOx quantity upstream of the SCR catalyst 13 (hereinafter, referred to as upstream NOx quantity Unox). The downstream NOx quantity calculation section M2 calculates the NOx quantity downstream of the SCR catalyst 13 (hereinafter, referred to as downstream NOx quantity Dnox). The basic addition quantity calculation section M3 calculates basic addition quantity Bure, which is a basic value of the urea solution addition quantity added by the urea solution addition valve 15 based on the upstream NOx quantity Unox. The addition quantity correction section M4 calculates the urea solution addition quantity Qure by correcting the basic addition quantity Bure calculated in the basic addition quantity calculation section M3 with an addition quantity correction value Cure calculated in a correction value calculation section M7 mentioned in detail later. The ammonia adsorption quantity calculation section M5 calculates ammonia adsorption quantity Qamm based on a difference between the upstream and downstream NOx quantities Unox, Dnox calculated in the upstream and downstream NOx quantity calculation sections M1, M2(=Unox−Dnox) and the urea solution addition quantity Qure at the time.

The upstream NOx quantity calculation section M1 may calculate NOx discharge quantity from the engine main body as the upstream NOx quantity Unox.

Concerning the calculation of the addition quantity correction value Cure, the construction of FIG. 2 has the ammonia adsorption quantity calculation section M5 mentioned above, a target value setting section M6 that sets a target value Tamm of the ammonia adsorption quantity Qamm and the correction value calculation section M7 that calculates the addition quantity correction value Cure based on a deviation between the ammonia adsorption quantity Qamm and the target value Tamm.

The urea solution addition quantity Qure as the summation of the basic addition quantity Bure and the addition quantity correction value Cure corresponds to an output value to the urea solution addition valve 15. The valve opening drive of the urea solution addition valve 15 is performed according to the urea solution addition quantity Qure, and thereby the urea solution addition control is performed.

Next, supplemental explanation about the ammonia adsorption quantity calculation section M5 will be given. The calculation section M5 calculates ammonia supply quantity VA supplied to the SCR catalyst 13 for each urea solution addition based on the urea solution addition quantity Qure of each time. Furthermore, the calculation section M5 calculates ammonia consumption quantity VB based on NOx reaction quantity, which is a difference between the upstream NOx quantity Unox and the downstream NOx quantity Dnox. Adsorption generation quantity VC, which is quantity of ammonia adsorption generated in each urea solution addition of the urea solution addition valve 15, is calculated from the ammonia supply quantity VA and the ammonia consumption quantity VB. Furthermore, the ammonia adsorption quantity Qamm as actual adsorption quantity in the SCR catalyst 13 is calculated by sequentially integrating the adsorption generation quantity VC. The adsorption generation quantity VC(=VA−VB) as the difference between the ammonia supply quantity VA and the ammonia consumption quantity VB at each time is time-series data of a reducing agent balance in the SCR catalyst 13. The adsorption generation quantity VC is calculated in a predetermined time cycle and the calculated value is sequentially integrated to calculate (estimate) the actual ammonia adsorption quantity Qamm in the SCR catalyst 13.

In the case where the ammonia adsorption quantity Qamm is calculated, it is anticipated that an error (an error between the actual adsorption quantity and the calculated value) is caused by various factors. Therefore, there is a concern that the control of the urea solution addition quantity is not performed appropriately when the error is included in the ammonia adsorption quantity Qamm, so the NOx purification rate deteriorates or ammonia slip occurs. The factors of the calculation error of the ammonia adsorption quantity include measurement errors of the various sensors, the ammonia slip, side reaction of the urea solution and the like. In such the case, the ammonia adsorption quantity Qamm is calculated as an integration value of the adsorption generation quantity VC calculated in the predetermined time cycle. It is anticipated that, if the calculation error is contained in the adsorption generation quantity VC each time, the calculation error gradually increases as the integration of the ammonia adsorption quantity Qamm proceeds more. If the calculation error enlarges in this way and the control based on the ammonia adsorption quantity is continued without change, such the control becomes meaningless. Rather, emergence of problems is anticipated.

Therefore, in the present embodiment, initialization processing of the ammonia adsorption quantity Qamm is performed suitably based on a NOx purification rate Rnox of the SCR catalyst 13 using a catalyst characteristic (refer to FIG.

7) indicating a relationship between the ammonia adsorption quantity Qamm and the NOx purification rate Rnox. Since the calculation error of the ammonia adsorption quantity Qamm is eliminated by the initialization processing, the control can be reverted to suitable NOx purification control even under a situation where the calculation error arises. Specifically in the present embodiment, focusing on a difference arising in the calculation error of the ammonia adsorption quantity Qamm according to the NOx quantity introduced into the SCR catalyst 13, timing for performing the initialization is decided based on the NOx quantity or a parameter correlated with the NOx quantity. Thus, the initialization of the ammonia adsorption quantity Qamm can be performed after waiting until the calculation error of the ammonia adsorption quantity Qamm becomes large, i.e., after waiting until a predetermined error generation state where the error of the ammonia adsorption quantity Qamm exceeds a predetermined quantity occurs, while grasping the calculation error of the ammonia adsorption quantity Qamm. More specifically, the NOx quantity introduced into the SCR catalyst 13 is sequentially integrated to calculate the NOx quantity integration value (equivalent to the parameter correlated with the NOx quantity). The timing for performing the initialization is decided based on the NOx quantity integration value.

The present embodiment employs a construction that clears the NOx quantity integration value to 0 each time the initialization is performed, thereby deciding the timing of the next initialization with an interval based on the timing of the previous initialization of the ammonia adsorption quantity.

In the case where the initialization processing of the ammonia adsorption quantity Qamm is performed based on the NOx purification rate Rnox of the SCR catalyst 13 using the relationship (the catalyst characteristic) between the ammonia adsorption quantity Qamm and the NOx purification rate Rnox as mentioned above, the actual NOx purification rate Rnox in the SCR catalyst 13 should be preferably calculated as accurately as possible. Therefore, in the present embodiment, the NOx purification rate Rnox is calculated when following execution conditions (A) to (E) are satisfied, and the initialization processing of the ammonia adsorption quantity Qamm is performed based on the calculated value of the NOx purification rate Rnox.

Condition (A): The NOx quantity introduced into the SCR catalyst 13 is equal to or greater than a predetermined value K1.

Condition (B): Increase/decrease in the NOx quantity introduced into the SCR catalyst 13 is smaller than a predetermined value K2.

Condition (C): The SCR catalyst temperature is lower than a predetermined value K3 (an ammonia slip determination value).

Condition (D): The SCR catalyst temperature is higher than a predetermined value K4 (a catalyst activity determination value).

Condition (E): The NOx purification rate Rnox is equal to or lower than a predetermined value K5 (an ammonia slip determination value).

In the above-mentioned conditions (A) and (B), "the NOx quantity introduced into the SCR catalyst 13" can be replaced with "the NOx discharge quantity from the engine main body." The NOx purification rate Rnox is calculated based on the sensing values of the NOx sensors 16, 18 upstream and downstream of the SCR catalyst 13 and the like. The predetermined values K1 to K5 of the above-described conditions (A) to (E) are set respectively and individually. Hereafter, the above-mentioned conditions will be explained individually.

Condition (A): The NOx quantity introduced into the SCR catalyst 13 is equal to or greater than the predetermined value K1.

As for the measurement accuracy of each of the various sensors such as the NOx sensor, a ratio of the error increases as the measurement value decreases. Therefore, the calculation accuracy of the NOx purification rate Rnox improves and the accuracy of the initialization of the ammonia adsorption quantity Qamm improves as the NOx quantity increases.

Condition (B): The increase/decrease in the NOx quantity introduced into the SCR catalyst 13 is smaller than the predetermined value K2.

In the SCR catalyst 13, if the introduced NOx quantity increases suddenly, the supply of the ammonia becomes insufficient temporarily due to delay in reaction time in an exhaust flow or in the catalyst, and the NOx purification rate Rnox falls. If the introduced NOx quantity decreases, the NOx purification rate Rnox increases. When the introduced NOx quantity increases, the calculated value of the NOx purification rate Rnox tends to be a small value. When the introduced NOx quantity decreases, the calculated value of the NOx purification rate Rnox tends to be a large value. If the change in the NOx quantity occurs with the change of the exhaust gas flow rate, the sensing error of the NOx sensor increases. Accordingly, the NOx purification rate Rnox can be calculated more correctly as the introduced NOx quantity stabilizes more. From the viewpoint of reducing the sensor sensing error, change of the exhaust temperature should be preferably also small.

It can be said that the increase/decrease in the introduced NOx quantity is relatively small when an engine operation state is a stationary state, or more specifically, when respective values such as engine rotation speed, fuel injection quantity, an intake flow rate and exhaust temperature are stable and change amounts of the respective values per specified time are less than predetermined values. Therefore, it can be also determined whether the increase/decrease in the introduced NOx quantity is smaller than the predetermined value K2 based on whether the engine operation state is the stationary state.

Condition (C): The SCR catalyst temperature is lower than the predetermined value K3 (the ammonia slip determination value).

Figure 6:
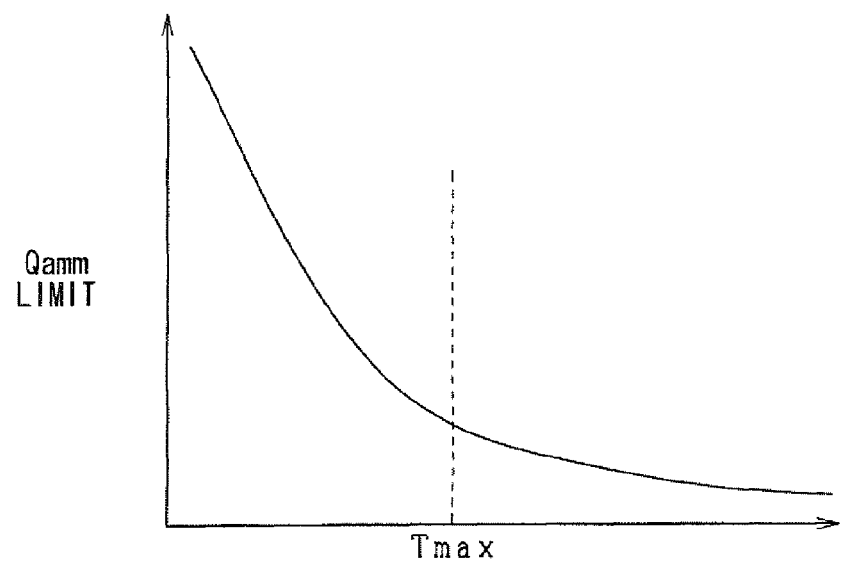
FIG. 6 is a diagram showing a relationship between catalyst temperature (or exhaust temperature) and a limit value of the ammonia adsorption quantity according to the first embodiment.

In the SCR catalyst 13, the catalyst temperature and the limit of the ammonia adsorption quantity Qamm have a relationship shown in FIG. 6. When the catalyst temperature is high, the limit of the ammonia adsorption quantity Qamm to the SCR catalyst 13 is small and the ammonia slip tends to occur. When the ammonia slip occurs, the ammonia is sensed together with NOx by the NOx sensor downstream of the SCR catalyst 13. As a result, the calculation error arises in the NOx purification rate Rnox. That is, the NOx sensor output is increased by the sensed quantity of the ammonia, and the NOx purification rate Rnox calculated based on the sensor output decreases. Due to the decrease of the NOx purification rate Rnox, erroneous control for increasing the ammonia is performed. In order to avoid such the erroneous control, when the catalyst temperature is high and there is a possibility of the ammonia slip, the initialization of the ammonia adsorption quantity Qamm based on the NOx purification rate Rnox is prohibited. More specifically, in the present embodiment, the predetermined value K3 is set based on ammonia adsorption limit temperature Tmax shown in FIG. 6, at which the ammonia adsorption quantity Qamm is substantially minimized (for example, K3=Tmax). Only when the catalyst temperature is lower than the predetermined value K3, the initialization of the ammonia adsorption quantity Qamm based on the NOx purification rate Rnox is performed.

Condition (D): The SCR catalyst temperature is higher than the predetermined value K4 (the catalyst activity determination value).

The purification reaction of NOx does not occur in the SCR catalyst 13 even if the urea solution is added when the temperature of the SCR catalyst 13 is lower than the activation temperature and the SCR catalyst 13 is inactive. In such the case, the NOx purification rate Rnox lowers irrespective of the ammonia adsorption quantity Qamm or the error in the ammonia adsorption quantity Qamm. As a result, the ammonia adsorption quantity Qamm cannot be estimated from the NOx purification rate Rnox. Therefore, in such the case, the initialization of the ammonia adsorption quantity Qamm should not be performed. That is, the initialization of the ammonia adsorption quantity Qamm based on the NOx purification rate Rnox is performed only when it is estimated that the temperature of the SCR catalyst 13 is equal to or higher than the activation temperature.

Condition (E): The NOx purification rate Rnox is equal to or lower than the predetermined value K5 (the ammonia slip determination value).

Figure 7:
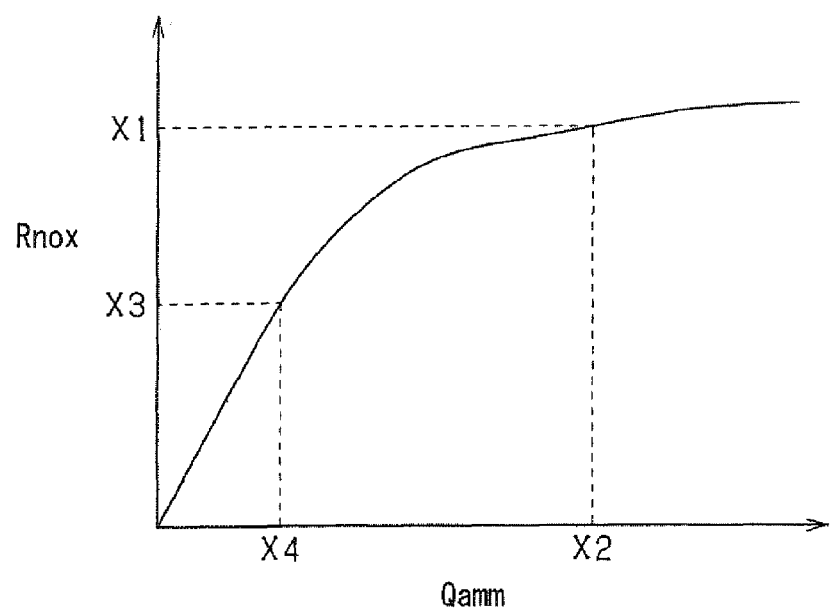
FIG. 7 is a diagram showing a relationship between the ammonia adsorption quantity and a NOx purification rate according to the first embodiment.

When the NOx purification rate Rnox is equal to or lower than the predetermined value, it is thought that the oversupply of the ammonia with respect to the NOx quantity is not caused and the ammonia slip does not occur. Therefore, there is only a low possibility that the NOx sensor is sensing the ammonia erroneously. Rather, there is a high possibility that the actual NOx purification rate Rnox is calculated correctly. A characteristic between the ammonia adsorption quantity Qamm and the NOx purification rate Rnox is shown in FIG. 7. The NOx purification rate Rnox improves as the ammonia adsorption quantity Qamm increases. However, when the ammonia adsorption quantity Qamm is equal to or greater than a predetermined value (for example, X2 in FIG. 7), there is little or no difference in the NOx purification rate Rnox. Therefore, the ammonia adsorption quantity Qamm can be estimated with high accuracy when the NOx purification rate Rnox is equal to or lower than a predetermined value (for example, X1 in FIG. 7), but it is difficult to accurately estimate the ammonia adsorption quantity Qamm when the NOx purification rate Rnox is equal to or greater than the predetermined value (for example, X1 in FIG. 7). Therefore, the initialization of the ammonia adsorption quantity Qamm based on the NOx purification rate Rnox is performed only when the NOx purification rate Rnox is equal to or lower than the predetermined value (K5 set based on X1 in FIG. 7).

Figure 3:
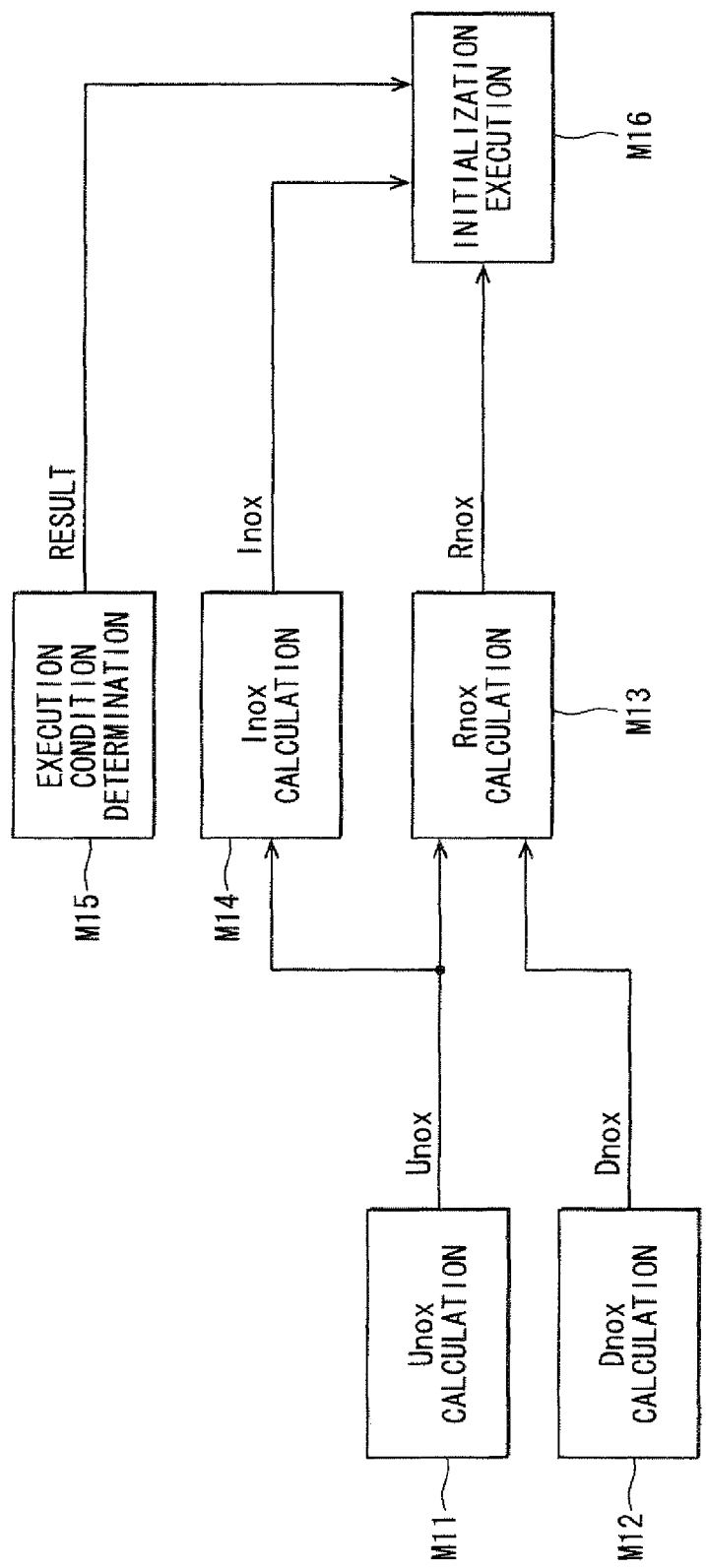
FIG. 3 is a functional block diagram related to initialization processing of ammonia adsorption quantity according to the first embodiment.

FIG. 3 is a functional block diagram concerning the initialization processing of the ammonia adsorption quantity Qamm according to the present embodiment.

The construction shown in FIG. 3 has an upstream NOx quantity calculation section M11, a downstream NOx quantity calculation section M12, a NOx purification rate calculation section M13, a NOx quantity integration value calculation section M14, an execution condition determination section M15 and an initialization execution section M16. The upstream NOx quantity calculation section M11 calculates the NOx quantity upstream of the SCR catalyst 13 (hereinafter, referred to as the upstream NOx quantity Unox). The downstream NOx quantity calculation section M12 calculates the NOx quantity downstream of the SCR catalyst 13 (hereinafter, referred to as the downstream NOx quantity Dnox). The NOx purification rate calculation section M13 calculates the NOx purification rate Rnox from the upstream NOx quantity Unox and the downstream NOx quantity Dnox. The NOx quantity integration value calculation section M14 calculates the NOx quantity integration value Inox by sequentially integrating the upstream NOx quantity Unox. The execution condition determination section M15 determines whether an execution condition of the initialization processing is satisfied based on the NOx quantity, the SCR catalyst temperature and the like. The initialization execution section M16 performs the initialization processing of the ammonia adsorption quantity Qamm based on the NOx purification rate Rnox when the initialization timing decided based on the NOx quantity integration value Inox occurs and the determination result of the execution condition determination section M15 is proper.

The initialization execution section M16 initializes the value calculated in the ammonia adsorption quantity calculation section M5 of FIG. 2 mentioned above, i.e., the ammonia adsorption quantity Qamm. The initialization execution section M16 updates the ammonia adsorption quantity Qamm of each time with the NOx purification rate Rnox calculated at the execution timing of the initialization.

The upstream and downstream NOx quantity calculation sections M11, M12 are the same as the upstream and downstream NOx quantity calculation sections M1, M2 of FIG. 2.

Figure 4:
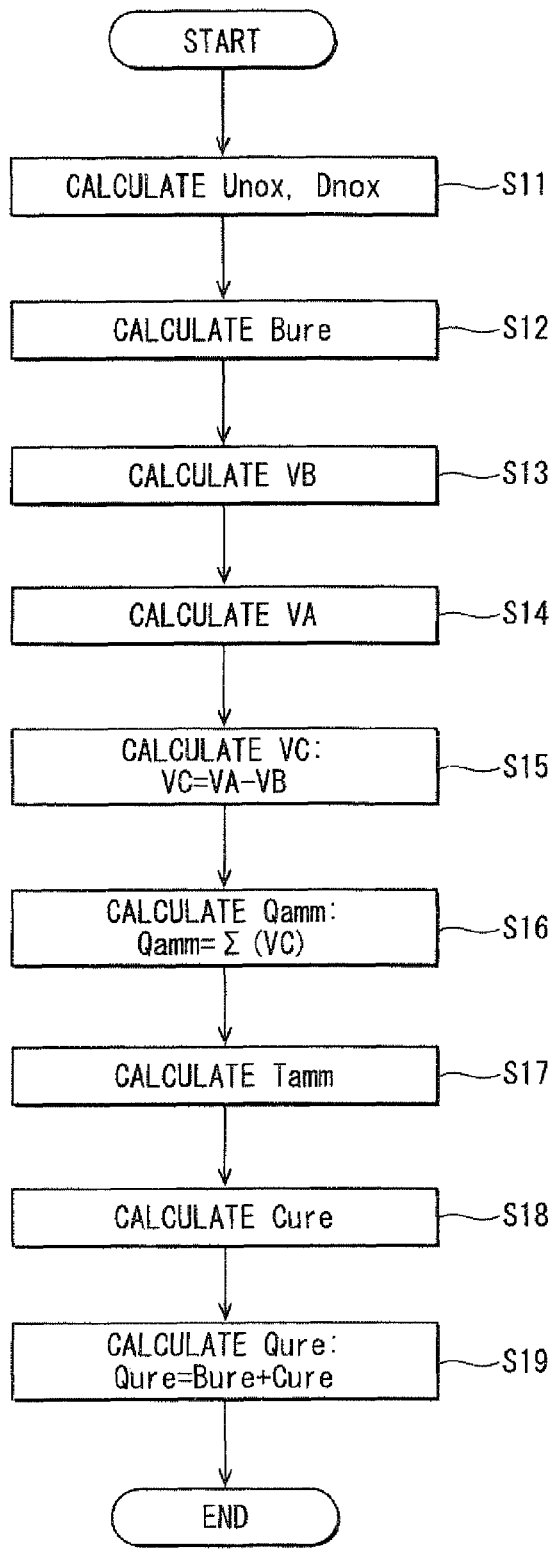
FIG. 4 is a flowchart showing calculation processing of the urea solution addition quantity according to the first embodiment.

Next, a calculation procedure of the urea solution addition quantity Qure and an initialization procedure of the ammonia adsorption quantity Qamm by the ECU 40 will be explained in detail. FIG. 4 is a flowchart showing the calculation processing of the urea solution addition quantity Qure and is repeatedly executed by the ECU 40 in a predetermined time cycle.

In FIG. 4, in S11, the upstream NOx quantity Unox and the downstream NOx quantity Dnox as the NOx quantities upstream and downstream of the SCR catalyst 13 are calculated. In S11, the upstream NOx quantity Unox is calculated based on the upstream NOx concentration sensed from the output value of the upstream NOx sensor 16 and an exhaust gas flow rate sensed from an output value of an airflow meter (not shown) provided in the intake pipe. The downstream NOx quantity Dnox is calculated based on the downstream NOx concentration sensed from the output value of the downstream NOx sensor 18 and the exhaust gas flow rate sensed from the output value of the airflow meter. Alternatively, the exhaust gas flow rate may be calculated using a map or an expression from operation state parameters such as the engine rotation speed and the fuel injection quantity. Alternatively, the exhaust gas flow rate may be measured with a flow rate sensor provided in the exhaust pipe.

In following S12, the basic addition quantity Bure of the urea solution is calculated. In S12, the upstream NOx quantity Unox is used as a parameter for the calculation, and the basic addition quantity Bure is calculated as a larger value as the upstream NOx quantity Unox increases.

In following S13, the NOx reaction quantity in the SCR catalyst 13 is calculated from the difference between the upstream NOx quantity Unox and the downstream NOx quantity Dnox. Further in S13, the ammonia consumption quantity VB in the SCR catalyst 13 is calculated based on the NOx reaction quantity. In this case, for example, it is desirable to calculate the ammonia consumption quantity VB from the NOx reaction quantity also in accordance with the temperature of the SCR catalyst 13 and the like.

In S14, the ammonia supply quantity VA as the quantity of the ammonia actually supplied to the SCR catalyst 13 due to the previous urea solution addition by the urea solution addition valve 15 is calculated based on the previous value of the urea solution addition quantity Qure. For example, it is desirable to calculate the ammonia supply quantity VA also in accordance with the exhaust gas temperature and the like.

In S15, the adsorption generation quantity VC as the quantity of the ammonia adsorbing to the SCR catalyst 13 due to the urea solution addition (i.e., ammonia supply) is calculated from the difference between the ammonia supply quantity VA and the ammonia consumption quantity VB. In following S16, the ammonia adsorption quantity Qamm is calculated by sequentially integrating the adsorption generation quantity VC calculated in S15.

Then, in following S17, the upper limit of the NOx purification rate Rnox of the SCR catalyst 13 is calculated from the SCR catalyst characteristic defined beforehand, and also the target value Tamm of the ammonia adsorption quantity Qamm is calculated from the upper limit of the NOx purification rate Rnox. The SCR catalyst characteristic is defined as the relationship between the ammonia adsorption quantity Qamm and the NOx purification rate Rnox, for example, as shown in FIG. 7. The target value Tamm of the ammonia adsorption quantity Qamm is calculated based on the upper limit (for example, X1 in FIG. 7), above which the NOx purification rate Rnox becomes substantially constant with respect to the ammonia adsorption quantity Qamm.

In S18, the addition quantity correction value Cure is calculated based on the deviation of the ammonia adsorption quantity Qamm from the target value Tamm. In the present embodiment, feedback control based on the ammonia adsorption quantity Qamm is performed. The deviation of the ammonia adsorption quantity Qamm from the target value Tamm is calculated and the addition quantity correction value Cure is calculated using a feedback method such as PI or PID to remove the deviation of the ammonia adsorption quantity Qamm.

Finally, in S19, the urea solution addition quantity Qure is calculated by adding the basic addition quantity Bure and the addition quantity correction value Cure. The urea solution addition is performed with the urea solution addition valve 15 based on the urea solution addition quantity Qure.

Figure 5:
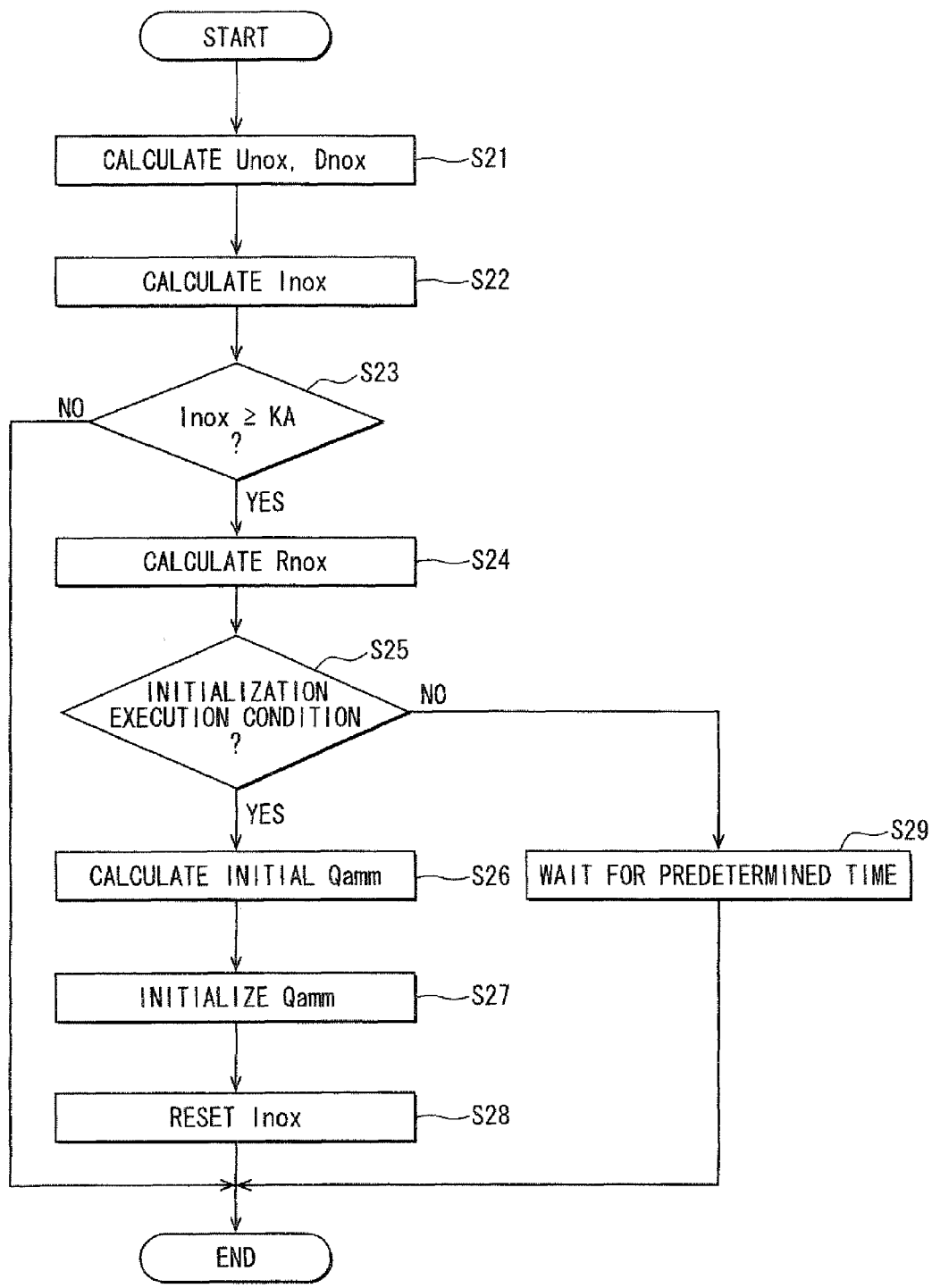
FIG. 5 is a flowchart showing initialization processing of the ammonia adsorption quantity according to the first embodiment.

FIG. 5 is a flowchart showing the initialization processing of the ammonia adsorption quantity Qamm. The ECU 40 performs the processing of FIG. 5 in a predetermined time cycle.

In FIG. 5, in S21, the upstream NOx quantity Unox and the downstream NOx quantity Dnox as the NOx quantities upstream and downstream of the SCR catalyst 13 are calculated. The calculation methods of the NOx quantities Unox, Dnox are the same as those of S11 of FIG. 4. A construction of reading the calculated values of S11 without change may be employed if the processing of FIG. 5 is performed continuously after the processing of FIG. 4.

Then, in following S22, the NOx quantity integration value Inox is calculated. In S22, the NOx quantity integration value Inox is calculated by integrating the upstream NOx quantity Unox, which is calculated for each processing of FIG. 5 (or FIG. 4), each time. The NOx quantity integration value Inox may be calculated also in accordance with the exhaust gas temperature, the engine rotation speed, the fuel injection quantity and the like.

In following S23, it is determined whether the NOx quantity integration value Inox is "equal to or greater than" a predetermined value KA. The predetermined value KA is a determination value set in order to decide the execution timing of the initialization. The predetermined value KA is set in accordance with a permissible value of the calculation error of the ammonia adsorption quantity Qamm. If the NOx quantity integration value Inox is smaller than the determination value KA, the processing is ended as it is. If the NOx quantity integration value Inox is equal to or greater than the determination value KA, the process proceeds to following S24.

In S24, the actual NOx purification rate Rnox in the SCR catalyst 13 is calculated from the upstream NOx quantity Unox and the downstream NOx quantity Dnox. The NOx purification rate Rnox is calculated by dividing the difference between the upstream NOx quantity Unox and the downstream NOx quantity Dnox by the upstream NOx quantity Unox as shown by a following expression.

$$Rnox = (Unox - Dnox)/Unox$$

In S25, it is determined whether the execution condition of the initialization processing is satisfied based on the NOx quantity, the SCR catalyst temperature and the like. That is, it is determined whether the NOx purification rate Rnox as the initialization data is proper. The execution condition of the initialization processing includes the following conditions (A) to (E) as mentioned above.

Condition (A): The NOx quantity introduced into the SCR catalyst 13 is equal to or greater than the predetermined value K1.

Condition (B): The increase/decrease in the NOx quantity introduced into the SCR catalyst 13 is smaller than the predetermined value K2.

Condition (C): The SCR catalyst temperature is lower than the predetermined value K3 (the ammonia slip determination value).

Condition (D): The SCR catalyst temperature is higher than the predetermined value K4 (the catalyst activity determination value).

Condition (E): The NOx purification rate Rnox is equal to or lower than the predetermined value K5 (the ammonia slip determination value).

Though all the conditions (A) to (E) are used altogether as the execution conditions of the initialization processing, some of the conditions may be excluded from the execution conditions. In short, the execution condition may be set arbitrarily as long as at least one of the conditions (A) to (E) is included therein. The SCR catalyst temperature is sensed from the output value of the temperature sensor 17 provided upstream of the SCR catalyst 13.

If the execution condition of the initialization processing is satisfied, the process proceeds to S26. If the execution condition is not satisfied, the process proceeds to S29.

In S26, an adsorption quantity initial value is calculated from the actual NOx purification rate Rnox at the time. In particular, for example, the initial adsorption quantity X4 is calculated from the actual NOx purification rate X3 at the time by using the relationship of FIG. 7.

In S27, the ammonia adsorption quantity Qamm (i.e., the value calculated in S16 of FIG. 4) is initialized with the adsorption quantity initial value. That is, the ammonia adsorption quantity Qamm is updated with the adsorption quantity initial value at the time. Then, in S28, the NOx quantity integration value Inox is cleared to zero. Then, the processing is ended.

When the execution condition of the initialization processing is not satisfied (i.e., when S25=NO), the process proceeds to S29 and waits for a predetermined time. After waiting for the predetermined time, the same execution condition is determined again. If the condition is satisfied, the above-described initialization processing (S26 to S28) is performed.

The present embodiment described above exerts following effects.

According to the construction of the above embodiment, the ammonia adsorption quantity Qamm is initialized at the timing decided based on the NOx quantity integration value Inox, focusing on the difference arising in the calculation error of the ammonia adsorption quantity Qamm in accordance with the NOx quantity introduced into the SCR catalyst 13. Therefore, the ammonia adsorption quantity Qamm can be initialized after waiting until the calculation error included in the ammonia adsorption quantity Qamm becomes large. Accordingly, the initialization processing of the ammonia adsorption quantity Qamm, that is, the error cancellation processing, can be performed in the state where the error of the ammonia adsorption quantity Qamm has come to be grasped clearly because of the accumulation of the error included in the time-series data of each time (i.e., the adsorption generation quantity VC). Since the reliability of the ammonia adsorption quantity Qamm is improved, the calculation accuracy of the urea solution addition quantity Qure calculated based on the ammonia adsorption quantity Qamm also improves. As a result, the calculation accuracy of the ammonia adsorption quantity Qamm in the SCR catalyst 13 can be improved, and eventually the NOx purification in the SCR catalyst 13 can be performed suitably.

According to the construction of the above embodiment, the execution timing of the initialization is determined based on the NOx quantity integration value Inox. Therefore, the timing when the initialization of the ammonia adsorption quantity Qamm is necessary can be determined appropriately even when the NOx quantity changes in accordance with the load or the rotation state of the engine. With the above construction, the initialization of the ammonia adsorption quantity Qamm can be performed at a comparatively short time interval, i.e., comparatively frequently, when the engine operation state at the high load or at the high rotation speed is continued.

According to the construction of the above embodiment, the initialization of the ammonia adsorption quantity Qamm is performed based on the actual NOx purification rate Rnox at the time by using the predetermined relationship between the ammonia adsorption quantity Qamm and the NOx purification rate Rnox. Accordingly, the suitable initialization of the ammonia adsorption quantity Qamm can be performed in consideration of the catalyst characteristic.

According to the construction of the above embodiment, it is determined whether the NOx purification rate Rnox as the initialization data of the ammonia adsorption quantity Qamm is proper when it is determined that the NOx quantity integration value Inox becomes equal to or greater than the predetermined value KA and the execution timing of the initialization occurs. Therefore, use of the unreliable initialization data (i.e., the NOx purification rate Rnox) can be eliminated, and the accuracy of the initialization of the ammonia adsorption quantity Qamm can be improved.

The above-mentioned conditions (A) to (E) are defined as the conditions for determining the properness of the initialization data. Accordingly, the NOx purification rate Rnox can be calculated correctly without being affected by the measurement accuracy of the various sensors such as the NOx sensor, the ammonia slips and the like. Thus, the accuracy of the initialization of the ammonia adsorption quantity Qamm can be improved.

According to the construction of the above embodiment, when it is determined that the NOx purification rate Rnox is improper although the execution timing of the initialization occurs and the precondition of the initialization of the ammonia adsorption quantity Qamm is satisfied, recalculation of the NOx purification rate Rnox is performed after waiting for the predetermined time. Accordingly, the initialization of the ammonia adsorption quantity Qamm can be performed appropriately. That is, even if the NOx purification rate Rnox becomes improper when or immediately after the precondition of the initialization of the ammonia adsorption quantity Qamm is satisfied, the above construction can inhibit the inconvenience of inability to perform the initialization because of the improperness of the NOx purification rate Rnox.

Second Embodiment

Next, a second embodiment of the present invention will be described, focusing on differences from the first embodiment. According to the construction of the above-described first embodiment, the NOx quantity integration value Inox is calculated sequentially, and it is determined whether the execution timing of the initialization has been reached based on whether the NOx quantity integration value Inox has become the predetermined value. This construction is changed in the second embodiment. In the second embodiment, every time the initialization of the ammonia adsorption quantity Qamm is performed, next initialization timing is decided based on the NOx quantity at the time. In this case, the initialization is performed when time elapses after the initialization and predetermined initialization timing is reached then.

Figure 8:
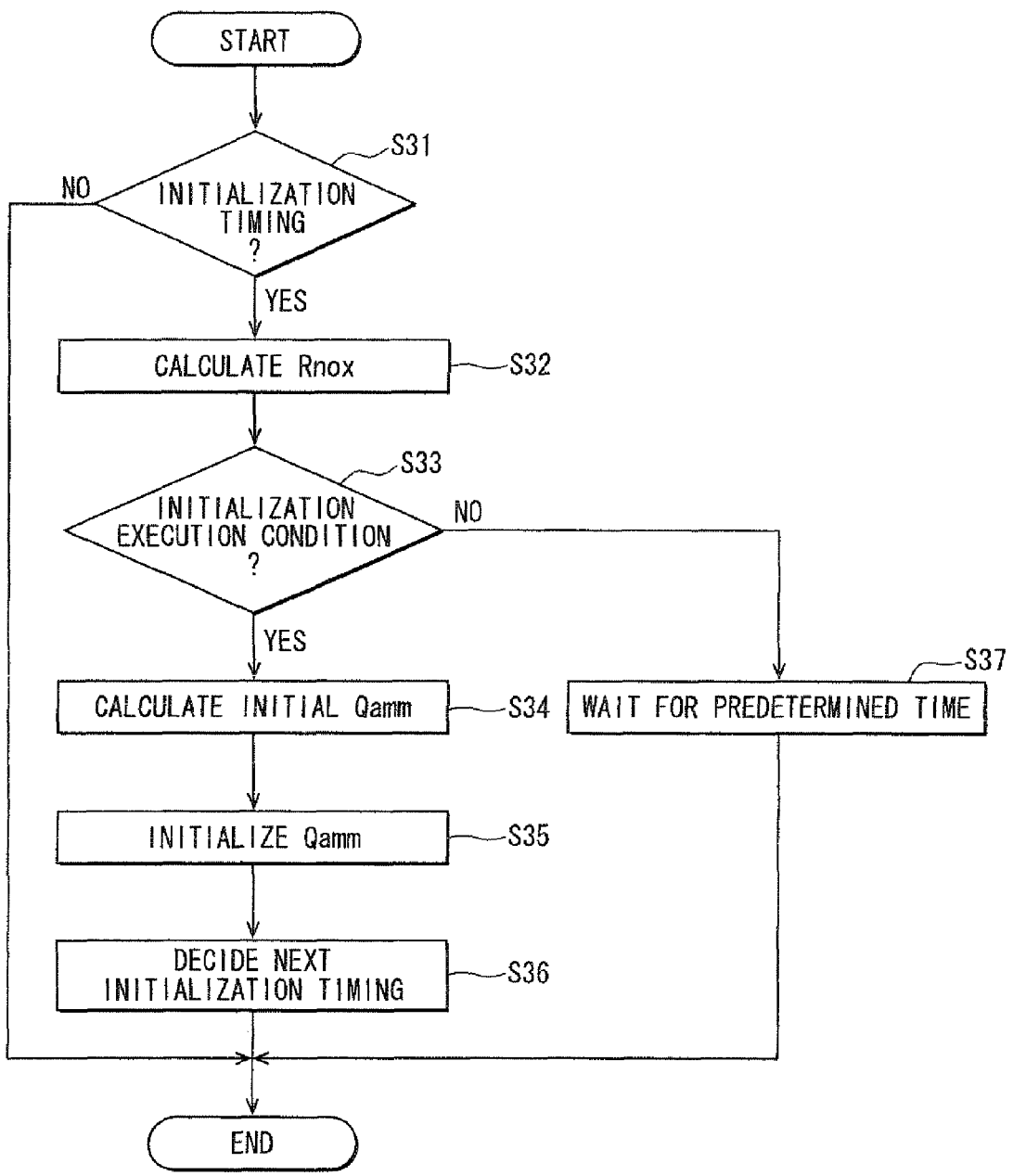
FIG. 8 is a flowchart showing initialization processing of ammonia adsorption quantity according to a second embodiment of the present invention.

FIG. 8 is a flowchart showing the initialization processing of the ammonia adsorption quantity Qamm according to the present embodiment. The ECU 40 repeatedly performs the processing of FIG. 8 in a predetermined time cycle. The processing of FIG. 8 (S32 to S35 and S37) other than S31 and S36 is the same processing as FIG. 5 mentioned above.

In S31 of FIG. 8, it is determined whether the present time is the initialization timing. Whether the present time is the initialization timing is determined based on whether time equivalent to an initialization interval TS has elapsed. The initialization interval TS is set in the previous initialization of the ammonia adsorption quantity Qamm. If the present time is the initialization timing (i.e., if the time equivalent to the initialization interval TS has elapsed after the previous initialization), the process proceeds to following S32. If the present time is not the initialization timing (i.e., if the time equivalent to the initialization interval TS has not elapsed yet), the processing is ended as it is. The occurrence of the initialization timing is equivalent to occurrence of a predetermined error generation state where the calculation error included in the calculation result of the ammonia adsorption quantity Qamm exceeds a predetermined amount.

In S32, the actual NOx purification rate Rnox in the SCR catalyst 13 is calculated (as in S24 of FIG. 5). Then, it is determined in S33 whether the execution condition of the initialization processing is satisfied, i.e., whether the NOx purification rate Rnox as the initialization data is proper, based on the NOx quantity, the SCR catalyst temperature and the like (as in S25 of FIG. 5). If the execution condition of the initialization processing is satisfied, the ammonia adsorption quantity Qamm is initialized with the actual NOx purification rate Rnox at the time (as in S26 and S27 of FIG. 5).

Figure 9:
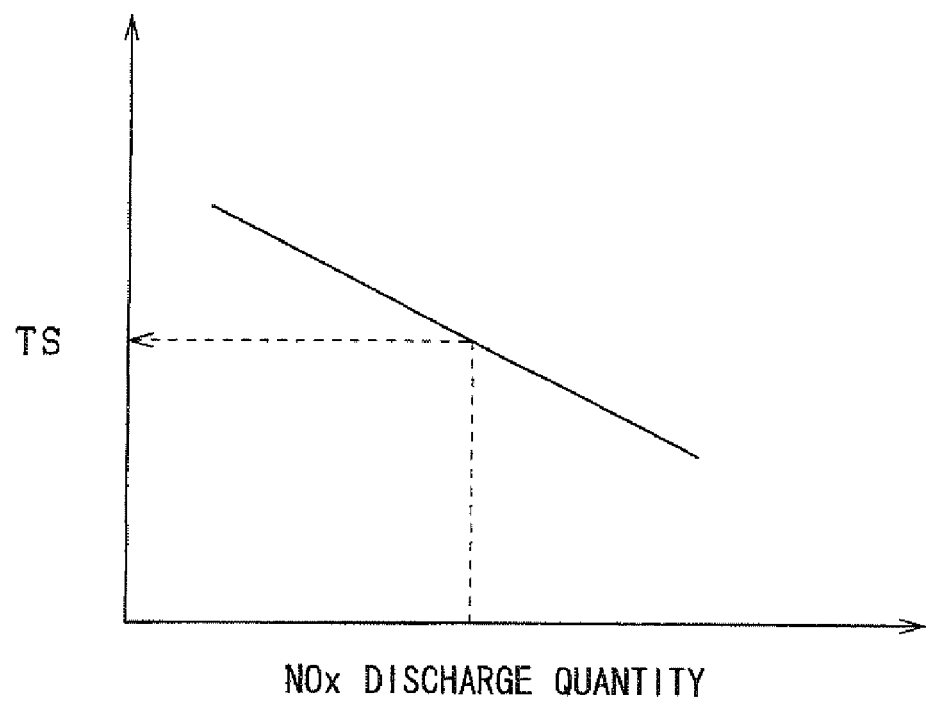
FIG. 9 is a diagram showing a relationship between NOx discharge quantity and an initialization interval according to the second embodiment.

In following S36, the next initialization timing is decided. Specifically in the present embodiment, a relationship shown in FIG. 9 is used and the initialization interval TS, which is the time interval to the next initialization, is calculated based on the NOx discharge quantity at the time (i.e., the upstream NOx quantity Unox). FIG. 9 is a diagram showing the relationship between the NOx discharge quantity and the initialization interval TS. According to FIG. 9, the initialization interval TS is set at a smaller value as the NOx discharge quantity increases. For example, the NOx discharge quantity is large when the engine load is high or the engine is in the high rotation speed state. In this case, the initialization interval TS is set to a comparatively short time interval. When the engine load is low or when the engine is in the low rotation speed state, the initialization interval TS is set to a comparatively long time interval.

If the execution condition of the initialization processing is not satisfied, the waiting processing of waiting for a predetermined time is performed in S37 (as in S29 of FIG. 5).

According to the present embodiment, the calculation accuracy of the ammonia adsorption quantity Qamm in the SCR catalyst 13 can be improved like the first embodiment described above. As a result, the NOx purification in the SCR catalyst 13 can be performed suitably.

The timing when the initialization of the ammonia adsorption quantity Qamm is necessary can be determined appropriately. With this construction, the initialization of the ammonia adsorption quantity Qamm can be performed at a comparatively short time interval, i.e., comparatively frequently, when the engine operation state at the high load or at the high rotation speed is continued.

Other Embodiments

The present invention is not limited to the above-described embodiments but may be implemented as follows, for example.

In the above-described first embodiment, the construction using the fixed value as the determination value (the predetermined value KA) of the NOx quantity integration value Inox for determining the execution timing of the initialization may be replaced with a construction variably setting the determination value. For example, the determination value may be set variably in accordance with a degradation degree of the SCR catalyst 13. In this case, the determination value (the predetermined value KA) should be preferably decreased as the degradation degree of the SCR catalyst 13 increases.

Concerning the initialization processing of the ammonia adsorption quantity, as shown in the functional block diagram of FIG. 3, the construction according to the first embodiment has the upstream NOx quantity calculation section M11, the downstream NOx quantity calculation section M12, the NOx purification rate calculation section M13, the NOx quantity integration value calculation section M14, the execution condition determination section M15 and the initialization execution section M16. This construction may be changed. For example, the execution condition determination section M15 in the construction of FIG. 3 may be eliminated. This construction is equivalent to a construction that does not perform the properness determination of the NOx purification rate Rnox at the initialization timing in the initialization execution section M16.

Alternatively, the NOx quantity integration value calculation section M14 of FIG. 3 may be eliminated. This construction is equivalent to a construction that does not perform the determination of the initialization timing using the NOx quantity integration value Inox in the initialization execution section M16. That is, the initialization of the ammonia adsorption quantity Qamm is performed on a condition that there occurs a state where the NOx purification rate Rnox of the SCR catalyst 13 can be calculated appropriately, without waiting until the predetermined error generation state of the ammonia adsorption quantity Qamm occurs.

The construction according to the above-described first embodiment senses the SCR catalyst temperature and determines the properness of the NOx purification rate Rnox as the initialization data based on whether the SCR catalyst temperature is in the predetermined temperature range. Alternatively, the temperature of the exhaust gas discharged from the engine main body may be sensed and the properness of the NOx purification rate Rnox as the initialization data may be determined based on whether the exhaust temperature is in a predetermined temperature range.

According to the above-described second embodiment, when the next initialization timing is decided during the initialization of the ammonia adsorption quantity Qamm, the initialization interval TS is calculated based on the NOx discharge quantity (i.e., the upstream NOx quantity) at the time. This construction may be changed. For example, when the next initialization timing is decided during the initialization of the ammonia adsorption quantity Qamm, a predetermined time interval may be set. That is, the initialization of the ammonia adsorption quantity Qamm may be performed at the same time interval (for example, approximately several tens of minutes) every time. Also with such the construction, the initialization processing of the ammonia adsorption quantity Qamm can be performed in the state where the error of the ammonia adsorption quantity Qamm has come to be grasped clearly because of the accumulation of the error included in the time-series data of each time. Therefore, the effect similar to the above-described effect can be expected.

The present invention can be embodied also in other systems than the urea SCR system described above. For example, the present invention can be embodied in a system that generates the urea solution or the ammonia as the reducing agent from solid urea as an ammonia generation source, a system that uses the fuel such as light oil as the ammonia generation source, a system that adds the ammonia directly to the exhaust passage, a system that uses a reducing agent (HC or the like) other than the ammonia or the like.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust gas purification device of an internal combustion engine applied to an exhaust gas purification system that has a NOx catalyst provided in an exhaust passage of the internal combustion engine for adsorbing a reducing agent and for selectively purifying NOx in exhaust gas with the reducing agent and that adds the reducing agent with a reducing agent adding unit upstream of the NOx catalyst with respect to a flow direction of the exhaust gas, the exhaust gas purification device comprising:

an adsorption quantity calculating unit configured to calculate a reducing agent adsorption quantity in the NOx catalyst based on time-series data of a balance between supply of the reducing agent to the NOx catalyst accompanying the addition of the reducing agent by the reducing agent adding unit and consumption of the reducing agent due to a reduction reaction in the NOx catalyst;

a NOx quantity calculating unit configured to calculate a NOx quantity introduced into the NOx catalyst or a parameter correlated with the NOx quantity; and an initialization performing unit configured to perform initialization of the reducing agent adsorption quantity at timing decided based on a calculation result of the NOx quantity calculating unit; wherein the NOx quantity calculating unit calculates a NOx quantity integration value by sequentially integrating the NOx quantity introduced into the NOx catalyst, and the initialization performing unit performs the initialization at timing when the NOx quantity integration value reaches a predetermined value.

2. An exhaust gas purification device of an internal combustion engine applied to an exhaust gas purification system that has a NOx catalyst provided in an exhaust passage internal combustion engine for adsorbing a reducing agent and for selectively purifying NOx in exhaust gas with the reducing agent and that adds the reducing agent with a reducing agent adding unit upstream of the NOx catalyst with respect to a flow direction of the exhaust gas, the exhaust gas purification device comprising:
    an adsorption quantity calculating unit configured to calculate a reducing agent adsorption quantity in the NOx catalyst based on time-series data of a balance between supply of the reducing agent to the NOx catalyst accompanying the addition of the reducing agent by the reducing agent adding unit and consumption of the reducing agent due to a reduction reaction in the NOx catalyst;
    a NOx quantity calculating unit configured to calculate a NOx quantity introduced into the NOx catalyst or a parameter correlated with the NOx quantity; and
    an initialization performing unit configured to perform initialization of the reducing agent adsorption quantity at timing decided based on calculation result of the NOx quantity calculating unit;
    wherein the initialization performing unit decides next initialization timing every time the initialization is performed.

3. The exhaust gas purification device as in claim 2, wherein
    the initialization performing unit decides the next initialization timing based on the NOx quantity at the time when the initialization is performed.

4. The exhaust gas purification device as in claim 1, further comprising:
    a purification rate calculating unit configured to calculate an actual NOx purification rate of the NOx catalyst, wherein
    the initialization performing unit performs the initialization of the reducing agent adsorption quantity according to the actual NOx purification rate, which is calculated by the purification rate calculating unit, based on a predetermined relationship between the reducing agent adsorption quantity and the NOx purification rate.

5. The exhaust gas purification device as in claim 4, further comprising:
    a properness determining unit configured to determine whether the NOx purification rate, which is calculated by the purification rate calculating unit at the timing when the initialization is performed, is a proper value to be used for the initialization, wherein
    the initialization performing unit performs the initialization of the reducing agent adsorption quantity when the properness determining unit determines that the NOx purification rate is proper.

6. The exhaust gas purification device as in claim 5, wherein
    the purification rate calculating unit calculates the NOx purification rate by using NOx quantity introduced into the NOx catalyst as a parameter, and
    the properness determining unit determines that the NOx purification rate is proper when the NOx quantity is equal to or greater than a predetermined quantity.

7. The exhaust gas purification device as in claim 5, further comprising:
    a unit configured to determine whether there is a state where surplus discharge of the reducing agent in the NOx catalyst is generated, wherein
    the properness determining unit determines that the NOx purification rate is proper when it is determined that there is no state where the surplus discharge of the reducing agent is generated.

8. The exhaust gas purification device as in claim 5, further comprising:
    a catalyst temperature sensing unit configured to sense a temperature of the NOx catalyst, wherein
    the properness determining unit determines that the NOx purification rate is proper when the NOx catalyst temperature sensed with the catalyst temperature sensing unit is in a predetermined temperature range.

9. The exhaust gas purification device as in claim 5, wherein
    if the properness determining unit determines that the NOx purification rate is improper, the purification rate calculating unit performs recalculation of the NOx purification rate after waiting for a predetermined time.

10. The exhaust gas purification device as in claim 1, wherein
    the adsorption quantity calculating unit has a unit configured to calculate a difference between supply quantity of the reducing agent to the NOx catalyst and consumption quantity of the reducing agent in the NOx catalyst for every specified time as the time-series data and a unit configured to calculate the reducing agent adsorption quantity in the NOx catalyst by sequentially integrating the calculated value of the time-series data.

11. The exhaust gas purification device as in claim 1, wherein
    the exhaust gas purification device controls the reducing agent addition quantity added by the reducing agent adding unit based on the reducing agent adsorption quantity calculated by the adsorption quantity calculating unit.

12. An exhaust gas purification device of an internal combustion engine applied to an exhaust gas purification system that has a NOx catalyst provided in an exhaust passage of the internal combustion engine for adsorbing a reducing agent and for selectively purifying NOx in exhaust gas with the reducing agent and that adds the reducing agent with a reducing agent adding unit upstream of the NOx catalyst with respect to a flow direction of the exhaust gas, the exhaust gas purification device comprising:
    an adsorption quantity calculating unit configured to calculate a reducing agent adsorption quantity in the NOx catalyst based on time-series data of a balance between supply of the reducing agent to the NOx catalyst accompanying the addition of the reducing agent by the reducing agent adding unit and consumption of the reducing agent due to a reduction reaction in the NOx catalyst;
    a purification rate calculating unit configured to calculate an actual NOx purification rate of the NOx catalyst;
    an initialization performing unit configured to perform initialization of the reducing agent adsorption quantity according to the actual NOx purification rate, which is calculated by the purification rate calculating unit, based on a predetermined relationship between the reducing agent adsorption quantity and the NOx purification rate; and
    a properness determining unit configured to determine whether the NOx purification rate calculated by the purification rate calculating unit is a proper value to be used for the initialization, wherein
    the exhaust gas purification device permits the initialization by the initialization performing unit on a condition that the properness determining unit determines that the NOx purification rate is proper;

the purification rate calculating unit calculates the NOx purifications rate by using NOx quantity introduced into the NOx catalyst as a parameter, and the properness determining unit determines that the NOx purification rate is proper when the NOx quantity is equal to or greater than a predetermined quantity.

13. The exhaust gas purification device as in claim 12, further comprising:

a unit configured to determine whether there is a state where surplus discharge of the reducing agent in the NOx catalyst is generated, wherein the properness determining unit determines that the NOx purification rate is proper when it is determined that there is no state where the surplus discharge of the reducing agent is generated.

14. The exhaust gas purification device as in claim 12, further comprising:

a catalyst temperature sensing unit configured to sense a temperature of the NOx catalyst, wherein the properness determining unit determines that the NOx purification rate is proper when the NOx catalyst temperature sensed with the catalyst temperature sensing unit is in a predetermined temperature range.

15. The exhaust gas purification device as in claim 12, wherein if the properness determining unit determines that the NOx purification rate is improper, the purification rate calculating unit performs recalculation of the NOx purification rate after waiting for a predetermined time.

16. The exhaust gas purification device as in claim 12, wherein the adsorption quantity calculating unit has a unit configured to calculate a difference between supply quantity of the reducing agent to the NOx catalyst and consumption quantity of the reducing agent in the NOx catalyst for every specified time as the time-series data and a unit configured to calculate the reducing agent adsorption quantity in the NOx catalyst by sequentially integrating the calculated value of the time-series data.

17. The exhaust gas purification device as in claim 12, wherein the exhaust gas purification device controls the reducing agent addition quantity added by the reducing agent adding unit based on the reducing agent adsorption quantity calculated by the adsorption quantity calculating unit.

* * * * *